(12) United States Patent
Heil et al.

(10) Patent No.: US 6,514,627 B1
(45) Date of Patent: Feb. 4, 2003

(54) METHOD FOR MAKING A STACKED REACTOR AND CATALYST DISK FOR A STACKED REACTOR

(75) Inventors: Dietmar Heil, Hörenhausen (DE); Oskar Lamla, Bissingen (DE); Martin Schübler, Ulm (DE)

(73) Assignee: Ballard Power Systems AG, Kirchheim/Teck-Nabern (DE)

( * ) Notice: Subject to any disclaimer, the term of this patent is extended or adjusted under 35 U.S.C. 154(b) by 0 days.

(21) Appl. No.: 09/357,964

(22) Filed: Jul. 21, 1999

(30) Foreign Application Priority Data

Jul. 21, 1998 (DE) .......................... 198 32 625

(51) Int. Cl.[7] .................................................. B22F 7/02
(52) U.S. Cl. ............................. 428/548; 419/2; 419/5; 419/6
(58) Field of Search .................. 419/6, 2, 5; 428/548

(56) References Cited

U.S. PATENT DOCUMENTS

| | | | |
|---|---|---|---|
| 4,396,480 A | | 8/1983 | Hegedus et al. |
| 5,146,743 A | * | 9/1992 | Maus et al. ............. 60/274 |
| 5,173,267 A | * | 12/1992 | Maus et al. ............. 422/179 |
| 5,174,951 A | * | 12/1992 | Nakai et al. ............. 419/2 |
| 5,322,672 A | * | 6/1994 | Breuer et al. ............. 422/180 |
| 5,487,865 A | * | 1/1996 | Hampton et al. ............. 419/5 |
| 5,993,502 A | * | 11/1999 | Motoki et al. ............. 55/487 |
| 6,033,788 A | * | 3/2000 | Cawley et al. ............. 428/548 |
| 6,088,839 A | * | 7/2000 | Autenrieth et al. ......... 423/350 |

FOREIGN PATENT DOCUMENTS

| | | | |
|---|---|---|---|
| DE | 2507 937 A1 | 9/1976 | |
| DE | 19743673 A1 | * 4/1999 | ............ B01J/35/02 |
| EP | 906890 | * 4/1999 | ............ C01B/3/32 |

* cited by examiner

Primary Examiner—Daniel J. Jenkins
(74) Attorney, Agent, or Firm—Crowell & Moring LLP

(57) ABSTRACT

A plurality of catalyst disks pressed from porous catalyst material are stacked one on the other and together sintered with the application of pressure to make a stacked reactor for hydrogen production from hydrocarbons. To form especially tight seams the catalyst disks have projections formed in the area of contact with an adjacent catalyst disk. Hollow spaces formed in the catalyst disk or formed by two adjacent catalyst disks have a system for supporting the hollow spaces, as for example a cooper grid placed in the hollow space, which can be covered at least partially by a metal sheet or supporting bars pressed onto the catalyst disk.

20 Claims, 1 Drawing Sheet

METHOD FOR MAKING A STACKED REACTOR AND CATALYST DISK FOR A STACKED REACTOR

BACKGROUND OF THE INVENTION

This application claims the priority of 198 32 625.4-41, filed Jul. 21, 1998, the disclosure of which is expressly incorporated by reference herein.

The present invention relates to a method for making a stacked reactor for the production of hydrogen from hydrocarbons from a plurality of catalyst disks stacked one on the other, as well as a catalyst disk especially suited for making such a stacked reactor.

German Patent Application 197 43 673.0 of the same assignee as the present application discloses such a stacked reactor formed from catalyst disks stacked one on the other. To make the stacked reactor, a thin and greatly compressed layer forming a body (catalyst disk) is formed from at least one catalyst powder by pressing, with copper powder, especially dendritic copper, being added to the catalyst powder. After compression the body is subjected to sintering, and then the individual catalyst disks are stacked one on the other and bonded to form a stacked reactor. In bonding together the individual catalyst disks, care must be taken to achieve a tight formation of the joints between the individual catalyst disks. In high-density ceramics, cementing, welding, soldering and clamping are known as joining methods. In the present case of a porous catalyst disk, these known joining methods can be only partially used.

In DE-OS 25 07 937 a tubular cleaving furnace with disk-shaped catalyst material is disclosed. The catalyst disks are carried centered on a support tube and have in the center a boss of greater thickness.

SUMMARY OF THE INVENTION

The invention addresses the problem of providing a method for making a stacked reactor which will permit an especially simple and low-cost production of a compactly built stacked reactor in which the active volume of the catalyst disks is not, or is but slightly, reduced and an especially tight configuration of the joints will be achieved. The invention is furthermore addressed to the problem of preparing a corresponding stacked reactor.

For the solution to this problem, a method is achieved according to the invention for making a stacked reactor in which sintering of the catalyst disks all together takes place in the stacked condition, as well as a stacked reactor for hydrogen production from hydrocarbons made from at least two catalyst disks produced by pressing catalyst material and sintered in the stacked condition. Accordingly, a sintering of the catalyst disks is performed in the green compact state, i.e., after the pressing, first all together in the stacked state. By the common sintering a tight joining of the individual catalyst disks is achieved. Because the sintering of all catalyst disks is performed together, and no longer individually, as in the prior art, working procedures can be eliminated, so that the method of the invention can be performed more simply and inexpensively.

In a currently contemplated embodiment of the invention, the sintering of the catalyst disks is performed by a predetermined application of pressure. By this compression sintering, an especially good bonding of the catalyst disks is achieved. Advantageously, the pressure application is sustained throughout the entire sintering process.

The predetermined application of pressure to the catalyst disks during sintering amounts advantageously to between 2 and 20 $N/mm^2$, preferably between 5 and 15 $N/mm^2$.

A catalyst disk for the construction of a stacked reactor according to the invention has projections in the area of contact with an adjacent catalyst disk for the formation of joints. When the catalyst disks are stacked in the green compact state, they no longer lie flat on one another but stand on one another at the projections formed circumferentially or interruptedly. This configuration makes it possible to form hollow spaces between the individual catalyst disks serving, for example, as channels. Since the pressure under which the catalyst disks lie one on the other is now no longer applied to the entire surface but only to the projections, an improved quality is achieved in the joint between the catalyst disks after sintering.

In an especially advantageous embodiment of the invention, hollow spaces, such as distribution and collection channels formed in the catalyst disk or by two adjacent catalyst disks, have a system for supporting the hollow spaces. Thereby, deformation of the catalyst disk or disks during the sintering is prevented.

In one embodiment of the invention, the support system is a copper grid, which is advantageously covered at least partially by a metal plate. In another, preferred embodiment of the invention, the support system of support consists of bars pressed onto the catalyst disk. In this manner the design is simplified and the cost of manufacture is minimized, since separate parts no longer need to be inserted into or between the catalyst disks.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
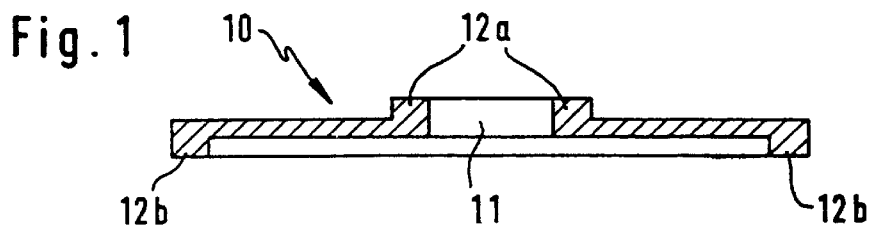
FIG. 1 is a sectional side view taken through a catalyst disk of the present invention.

FIG. 1 shows in a side view a section through a disk 10 of catalyst material according to the invention in the green compact state, to be referred to hereinafter for simplicity as a catalyst disk. The catalyst disk 10 is a thin and greatly compressed layer formed from at least one catalyst powder by compressing a compact which has a centrally disposed opening 11 and projections 12a, 12b formed at the inner and outer margins.

Figure 2:
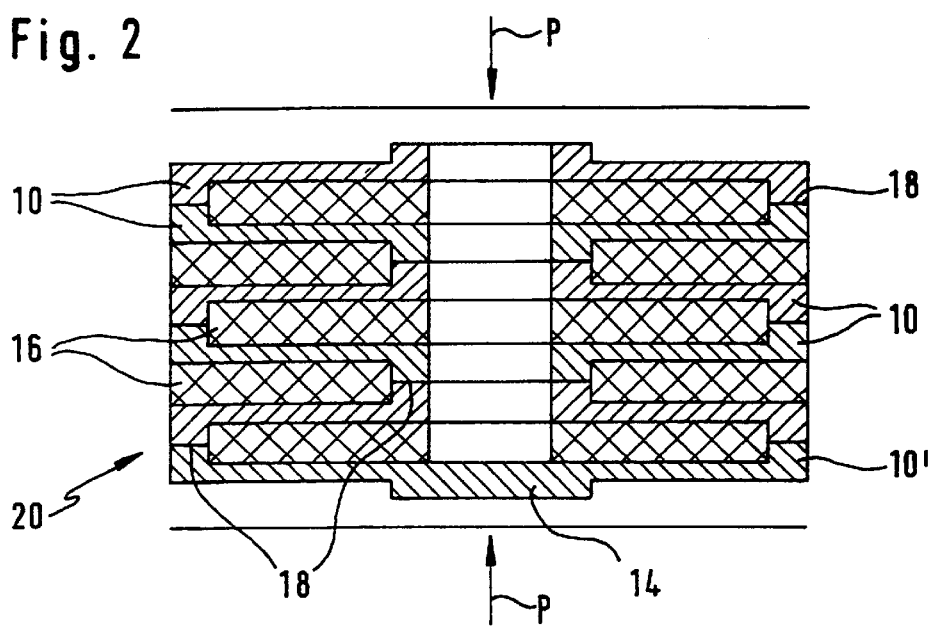
FIG. 2 is a sectional side view taken through a stacked reactor formed of a plurality of catalysts disks according to the invention, stacked one on the other, prior to sintering under pressure.

As it can be seen in FIG. 2, the alternating stacking of a plurality of catalyst disks each rotated 180° builds up a basic structure for a stacked reactor 20 in which the projections 12a, 12b of adjacent catalyst disks 10 come to rest one on the other. The contacts or joints between the individual catalyst disks 10 are provided with the reference numeral 18. The projections 12a, 12b space apart the surfaces of the catalyst disks 10 so that hollow spaces are formed between the individual catalyst disks 10 and are filled with grids 16 as the supporting system. The structure of the stacked reactor 20 is terminated at the bottom by a catalyst disk 10' which is completely closed at the center 14.

For the formation of a stacked reactor the catalyst disks 10, which are stacked on one another, are sintered together by the application of pressure designated by arrow P. This common sintering under pressure forms the joints 18 between the catalyst disks 10, the joints being airtight in comparison to the porous bodies of the catalyst disks 10. The common sintering can be further enhanced by roughening the press skin formed at the seams 18 by the pressing procedure to remove the press skin.

The installation of the copper grids 16 as the support means in the hollow spaces between the catalyst disks 10 supports the areas of the catalyst disk 10 that are spaced apart so that no deformation can occur during the sintering process. The projections 12a, 12b can be more greatly compressed during the pressing of the catalyst disk, so that the tightness of the resulting joint is further improved.

Figure 3:
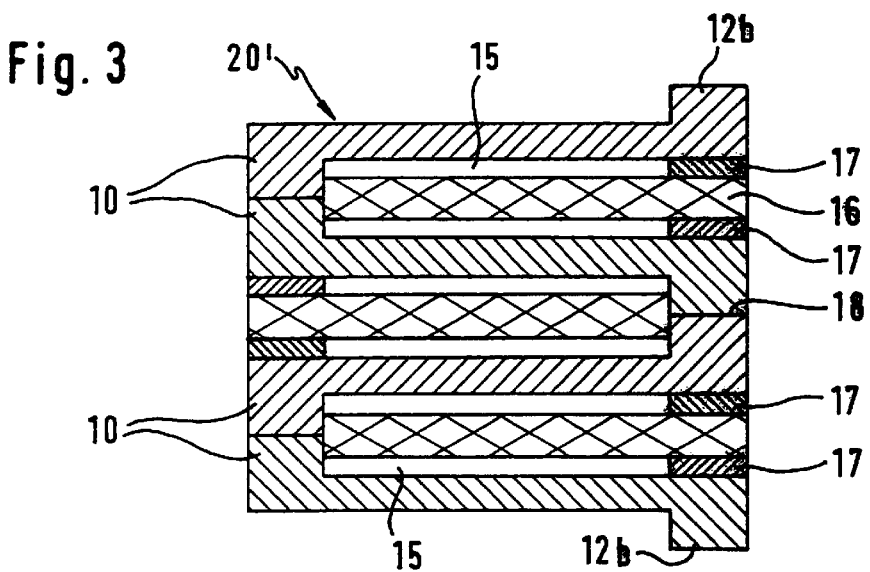
FIG. 3 is side sectional view taken through a second embodiment of a stacked reactor formed from a plurality of catalyst disks of the invention stacked one on the other.

FIG. 3 shows a section of a stacked reactor 20' which is of a construction similar to the stacked reactor shown in FIG. 2. In contrast to the stacked reactor 20 of FIG. 2, however, grids 16 are inserted as supporting devices into the spaces 15 between the catalyst disks 10. Stainless steel plates 17 have a thickness of about 0.2 mm, which in the area of the projections 12a, 12b are partially covered with the stainless steel metal plates 17 which have a cross section which correspond to the cross section of the projections 12a, 12b or seams 18, so that the same contact pressures prevail in each layer.

Of course, the catalyst disks and stacked reactors represented and described are only examples of embodiments which, of course, are not intended to limit the scope of the claimed invention. Thus, the support means for supporting the areas of the catalyst disks adjoining hollow spaces can be made in one piece with the catalyst disk. For that purpose bars are pressed onto the catalyst disk, which advantageously project substantially vertically from the catalyst disk and whose length corresponds to once or twice the height of the projections 12a, 12b.

The present invention is also not restricted to the illustrated arrangement of the projections 12a, 12b. Depending on the desired geometry of the hollow spaces in the stacked reactor, any desired arrangement of the projections is possible. Also, the construction of the stacked reactor by alternate stacking of catalyst disks rotated each 180° apart is, of course, variable. In conclusion, the term, "catalyst disk" as used herein includes both the pressed compact in the green state and the body subjected to the sintering process.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for making a stacked reactor for producing hydrogen from hydrocarbons, comprising the steps of stacking a plurality of catalyst disks formed of material capable of producing hydrogen from hydrocarbons on top of one another, and sintering the stacked catalyst disks together.

2. The method according to claim 1, wherein the step of sintering is performed under a predetermined positive application of pressure.

3. The method according to claim 2, wherein the application of the pressure is sustained during the step of sintering.

4. The method according to claim 2, wherein the application of the pressure amounts to between 2 and 20 N/mm$^2$.

5. The method according to claim 4, wherein the application of the pressure is sustained during the step of sintering.

6. The method according to claim 2, wherein the application of the pressure amounts to between 5 and 15 N/mm$^2$.

7. The method according to claim 6, wherein the application of the pressure is sustained during the step of sintering.

8. A stacked reactor for producing hydrogen from hydrocarbons, comprising at least two sintered pre-stacked catalyst disks of material pre-pressed to be capable of producing hydrogen from hydrocarbons.

9. The stacked reactor according to claim 8, wherein the catalyst disks include projections in an area of contact with an adjacent catalyst disk.

10. The stacked reactor according to claim 9, wherein hollow spaces in a catalyst disk or constituted by two adjacent catalyst disks have means for supporting hollow spaces.

11. The stacked reactor according to claim 10, wherein the means for supporting is a copper grid.

12. The stacked reactor according to claim 11, wherein the copper grid comprises at least partially covered by a metal plate.

13. The stacked reactor according to claim 10, wherein the means for supporting comprises bars pressed onto the catalyst disk.

14. A stacked reactor for producing hydrogen from hydrocarbons, made by the process of claim 1.

15. The stacked reactor according to claim 14, wherein the step of sintering is performed under a predetermined positive application of pressure.

16. The stacked reactor according to claim 15, wherein the application of the pressure is sustained during the step of sintering.

17. The stacked reactor according to claim 15, wherein the application of the pressure amounts to between 2 and 20 N/mm$^2$.

18. The stacked reactor according to claim 17, wherein the application of the pressure is sustained during the step of sintering.

19. The stacked reactor according to claim 15, wherein the application of the pressure amounts to between 5 and 15 N/mm$^2$.

20. The stacked reactor according to claim 19, wherein the application of the pressure is sustained during the step of sintering.

* * * * *